US008355969B2

(12) United States Patent  
Orr (10) Patent No.: US 8,355,969 B2  
(45) Date of Patent: Jan. 15, 2013

(54) CREDIT AND/OR DEBIT CARD SECURITY

(75) Inventor: David Anthony Orr, Cornelius, NC (US)

(73) Assignee: Bank of America Corporation, Charlotte, NC (US)

( * ) Notice: Subject to any disclaimer, the term of this patent is extended or adjusted under 35 U.S.C. 154(b) by 245 days.

(21) Appl. No.: 12/845,169

(22) Filed: Jul. 28, 2010

(65) Prior Publication Data

US 2012/0030078 A1    Feb. 2, 2012

(51) Int. Cl.  
*G06Q 40/00*    (2012.01)
(52) U.S. Cl. ................ 705/35; 705/1.1; 705/38; 705/39
(58) Field of Classification Search .................. 705/1.1, 705/35, 38, 39  
See application file for complete search history.

(56) References Cited

U.S. PATENT DOCUMENTS

| 7,578,438 | B2 * | 8/2009 | Hogg et al. ............... 235/380 |
| 8,165,961 | B1 * | 4/2012 | DiMartino et al. ........... 705/44 |
| 2002/0073022 | A1 * | 6/2002 | Wisecarver et al. .......... 705/38 |
| 2002/0120563 | A1 * | 8/2002 | McWilliam et al. .......... 705/39 |
| 2003/0097331 | A1 * | 5/2003 | Cohen ....................... 705/39 |
| 2010/0024681 | A1 * | 2/2010 | Krietsch et al. ........... 106/31.6 |
| 2011/0089233 | A1 * | 4/2011 | Locher ..................... 235/380 |

OTHER PUBLICATIONS

Revolution Money Introduces MoneyExchange Revolution Card Sep. 11, 2008.*  
Revolution Card Poised to Become the Next Big Credit by Odur Joe on Apr. 6, 2009.*  
American Express to Acquire Revolution Money to Develop Next Generation Payment Products Anonymous. Business Wire. New York: Nov. 18, 2009.American Express to Acquire Revolution Money to Develop NextGeneration.*  
Nov. 18, 2009, 12:00 AM American Express targets web and mobile payments with $300 million deal.*

* cited by examiner

*Primary Examiner* — William Rankins  
(74) *Attorney, Agent, or Firm* — Banner & Witcoff, Ltd.; Michael A. Springs (57) ABSTRACT

A system and method of providing heightened debit and/or credit card security is presented. The debit and/or credit card may be void of any information printed on the card that may provide identification of the user, an account number associated with the card, an expiration date for the card, and the like. In some examples, a portion of this information may be provided, but not all pieces of information, in order to reduce the likelihood of unauthorized use, such as during an online transaction where a user must input information generally found on the face of or rear of the card itself.

24 Claims, 7 Drawing Sheets

CREDIT AND/OR DEBIT CARD SECURITY

BACKGROUND

The use of debit and credit cards today is possibly at an all time high. All manner of transactions, including purchases of goods and/or services either at a merchant location, online, and the like, are often conducted using debit or credit cards. However, this increase in use of this convenient payment medium also increases the likelihood for loss or theft of cards that may then lead to fraudulent uses of the card. In particular, since, generally speaking, all information necessary to complete a transaction, either at a merchant or online, is generally visually available on the card itself, use of the card by an unauthorized person is relatively simple. Accordingly, a debit and/or credit card having heightened security by providing limited visual information regarding the user, account number, and the like on the card would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a system and method of providing a debit and/or credit card having heightened security is provided. In some examples, the debit and/or credit card may be void of certain information associated with the user, such as a name, account number, expiration date, and the like that is generally provided on the card. For instance, a debit or credit card may be void of some or all of the information items that are generally printed on the face of the card in order to minimize the potential for fraudulent uses. For instance, an on-line transaction may be difficult or impossible if the card does not provide the name, account number, or expiration date. Accordingly, an unauthorized user may not be able to complete a fraudulent transaction due to lack of sufficient information.

In some examples, all information may be encoded on a magnetic strip on a rear of the card. Alternatively, the magnetic strip may be encoded with limited information in order to further heighten security.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
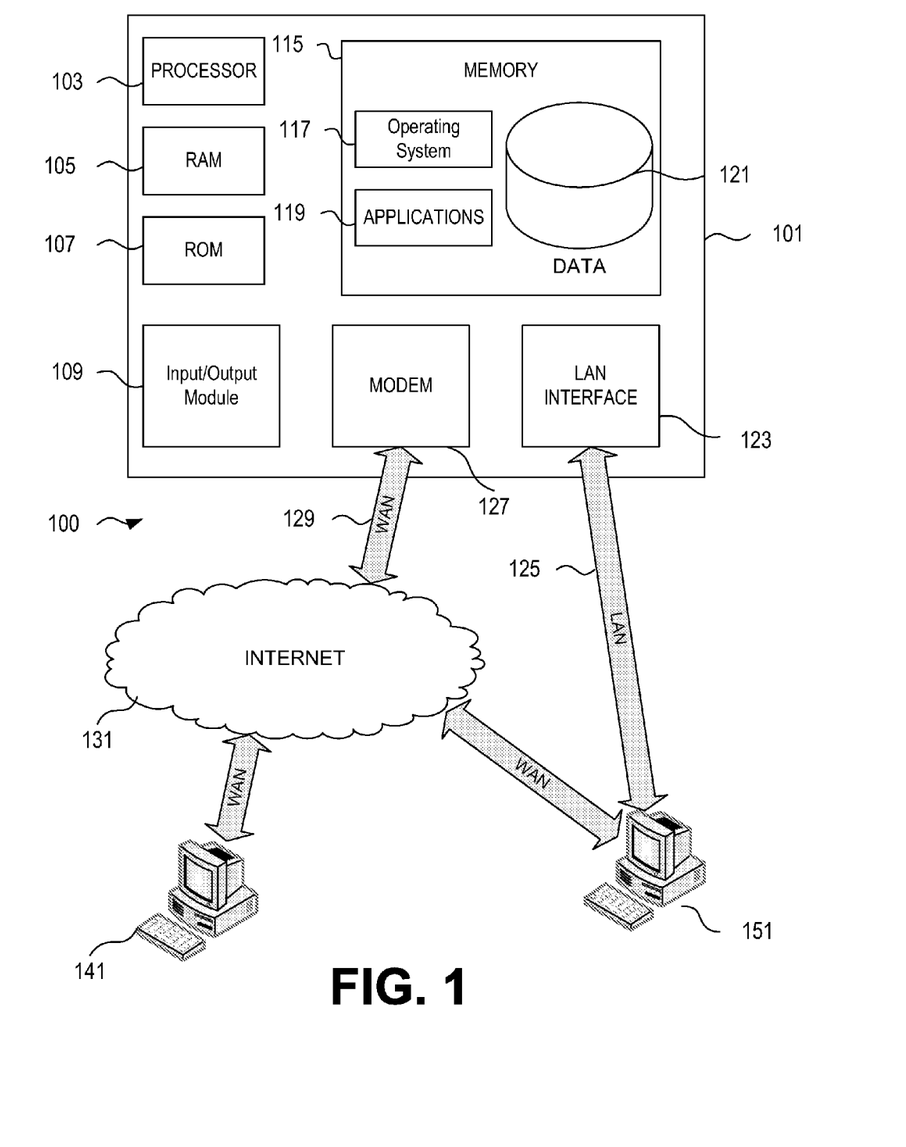
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices The above-described systems may be used in various financial institutions, point of sale systems, and the like in which transactions take place using a payment card, such as a debit card, credit card, and the like. Although many examples throughout this application will include the use of a debit card, aspects of this invention may be used in conjunction with credit cards, gift cards, and various other payment devices and/or payment cards.

In some examples, additional security features, measures, and the like may be desired when conducting a transaction. For instance, a user may desire to have limited information printed on a debit card or other payment device, such as a credit card, in order to avoid or minimize the damage that may be caused by fraudulent uses of the card should it be lost or stolen. For instance, providing limited information on the face of the debit/credit card may prevent an unauthorized user from conducting online transactions using the card because sufficient and/or required information to complete the transaction (e.g., account number, expiration date, name, and the like) may not be available on the card. Accordingly, a lost or stolen card having insufficient information to conduct an online transaction may be limited to use in-store where a sales representative may have to confirm a signature, and the like. Various examples of providing limited user and/or account information on the face of the debit card will be described more fully below.

Figure 2:
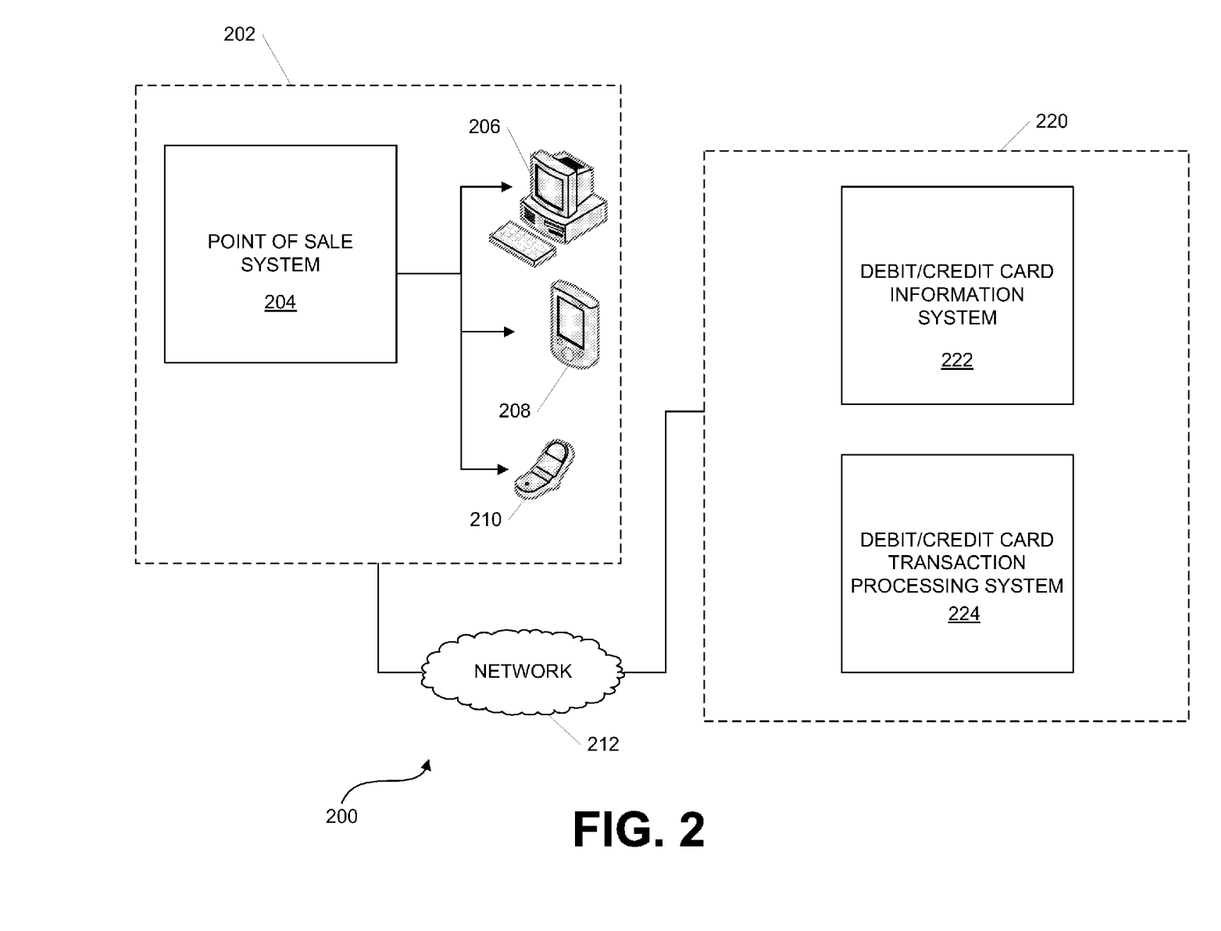
FIG. 2 illustrates an example system for conducting debit and/or credit card transactions according to one or more aspects described herein.

FIG. 2 provides one example system in which a debit card, credit card or other payment device may be used to complete a transaction, such as a purchase of goods or services. The system 200 may include consumer transaction side portion 202 and a financial institution side portion 220. The transaction side portion 202 may include a point of sale system 204 at which one or more transactions may occur. In some examples, the point of sale system 204 may be a cash register at a retail store, restaurant or other merchant establishment. In some examples, the point of sale system may include a computing device 206, PDA 208, cell phone 210, smart phone, and the like at which on-line transactions may be conducted.

The point of sale system 204 may be connected to the financial institution 220 by a network, such as the Internet 212. In order to process a transaction conducted at the point of sale system 204, the point of sale system 204 may connect to the financial institution 220 and may process the transaction, such as via the debit/credit card transaction processing system 224. In some examples, such as when all information about the account, user, and the like is not available on the debit or credit card itself, the information may be retrieved from a debit/credit card information system. For instance, some transactions require input of additional information in order to complete a transaction. For example, a user may have to input a personal identification number. In some examples, a personal identification number (PIN) may be a unique identifier associated with the debit or credit card. The PIN may be provided by the user to the financial institution in order to gain access to the card or its functionality. The debit and/or credit card information system 222 may receive the PIN number and confirm that it is accurate prior to processing the transaction. In other examples, a user, such as a store clerk or other individual processing the transaction, may be requested to input the last four digits of the account number associated with the debit and/or credit card. However, in instances in which the account number is not printed on the card, the appropriate information may be retrieved from the debit/credit card information system 222.

Traditional transactions that may take place at a point of sale system 204, such as a purchase at a store, restaurant, and the like, may rely on information encoded on a magnetic strip on a back side of the debit and/or credit card. In some examples, this encoded information may include all necessary information to complete a transaction using the card, however, all conventional information may not appear on the face of the card. For example, a conventional debit or credit card may include the name of the user, account number associated with the card, expiration date of the card, and the like. However, aspects of this invention relate to debit and/or credit cards in which some or all of this information is not printed or visually provided on the card. However, the information may be encoded in the magnetic strip and may thereby provide the ability to complete a transaction using the card. However, the card may not be available for use in certain transactions, such as on-line transactions, that require manual input of data (such as account number, expiration number, name on the card, and the like) because this data is not available on the card and may not be known to the user. This may heighten security associated with the card because it may aid in reducing fraudulent transactions that may be attempted if the card is lost or stolen because the necessary information may not be available on the face of the card.

Figure 3:
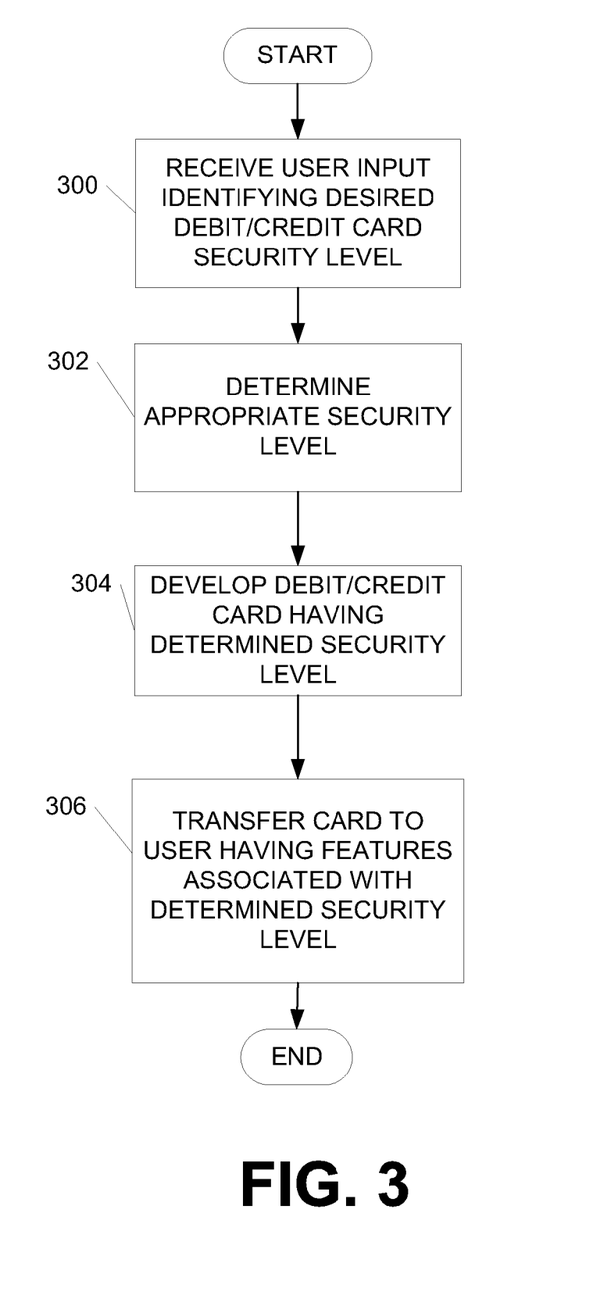
FIG. 3 illustrates one example method of providing a debit and/or credit card with heightened security according to one or more aspects described herein.

FIG. 3 illustrates one example method of providing a debit and/or credit card with heightened security by removing identifying information visually provided on the debit/credit card. In step 300, a user request may be received identifying a desired heightened level of security for a requested debit and/or credit card. For instance, a plurality of security levels may be provided to users and a user may request a desired level of security. Additionally or alternatively, a user may request a heightened level of security and, in step 302, an appropriate debit/credit card security level may be determined. In step 304, a debit and/or credit card having the determined level of security may be generated and/or created. In some examples, the card may provide no visual information identifying the user, account, and the like associated with the debit/credit card. In other examples, a portion of the identifying information may be withheld and may not visually appear on the face of the card. For instance, the card may include the name of the user but might not visually provide the account number associated with the debit/credit card. In another example, the debit/credit card may include the account number associated with the card but might not visually provide the expiration date of the card (which is generally required to complete certain transactions, such as online transactions). Once the debit/credit card with the desired level of security is developed, it may be transferred to a user for use in step 306.

Although certain types of identifying information may not appear on the debit/credit card, the card may still be eligible for use in transactions. For instance, all information may be encoded on the magnetic strip on the rear of the card, thereby allowing use of the debit/credit card at conventional retail establishments, restaurants, and the like. Also, a user may obtain a card having an account number printed on it but no visual indication of the name associated with the card or the account number. A user may then use this card in on-line transactions by providing the name and expiration date as needed either from memory or from additional account/debit card documents provided with the card.

In some examples, two or more debit and/or credit cards may be associated with the same account, such as a savings, checking, money market, and the like account at a financial institution. A user may desire to have one card with heightened security while the other card has a standard security level. Accordingly, the card having the standard security level may include information generally provided on a debit/credit card, such as a name, account number, expiration date, and the like. However, the card with heightened security may not have one or more pieces of information provided visually on the card. This arrangement may be advantageous for children or teenagers whose parents may give access to the debit/credit card but wish to prevent the child or teenage from making excessive online purchases, and the like. The card may include one or more identifying indicators, as will be discussed more fully below.

Figure 4:
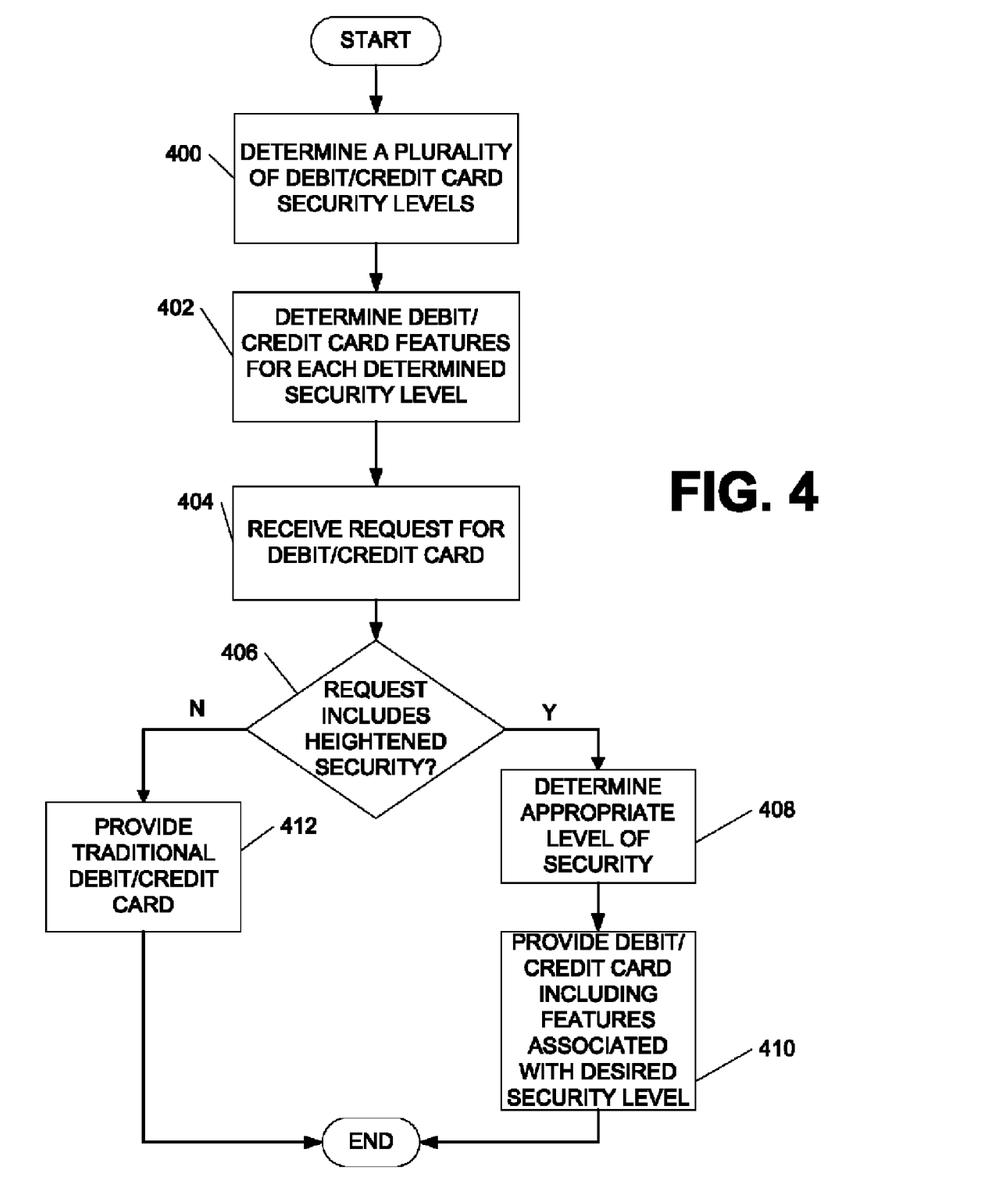
FIG. 4 illustrates another example method for providing a debit and/or credit card with heightened security according to one or more aspects described herein.

FIG. 4 illustrates another method of providing a debit and/or credit card with heightened security. In step 400, a plurality of debit/credit card security levels may be determined. In some examples, the security levels may be determined by the financial institution associated with or providing the debit/credit card. In step 402, debit card features associated with each level of security may be determined. For instance, one security level may include a conventional level of security in which all standard information (e.g., name, account number, expiration date, card security code (CSC), and the like) is provided on the card. Another level of security may include a portion of that information being removed from the visual appearance of the card, however, the information would remain encoded on the magnetic strip on the rear of the card. Still another example level of security may include none of the standard information being visually available on the card, however, the information may still be encoded on the magnetic strip. In yet another example level, some or all of the user information (name, expiration date, account number, CSC, and the like) may be removed from the card and the information encoded on the magnetic strip may also be limited (e.g., may include less than the information provided on the strip in conventional systems). This arrangement may require additional user input when the card is used in order to complete a transaction. In still other examples, some or all of the information may not be visually available on the front of the card and some or all of the information encoded on the magnetic strip on the card may be encrypted, as will be discussed more fully below.

In step 404, a request for a debit/credit card is received, such as from a customer or user. In step 406, a determination is made as to whether the request includes a request for heightened or additional security. In some examples, the user may request heightened security. In other examples, the heightened security may be offered by the entity receiving the request for the debit/credit card. If the request includes heightened security (or heightened security is deemed appropriate), the appropriate level of security from the plurality of determined security levels may be determined in step 408. The appropriate level of security may be based on a request from the user/requestor, amount of funds associated with the debit/credit card, intended use or frequency of use of the debit/credit card, and the like. In step 410 the debit/credit card may be provided to the requestor with the appropriate security features for the determined level of security.

Alternatively, if, in step 406, it is determined that the request does not include a request for heightened security (or that heightened security is not necessary or appropriate) a conventional debit/credit card, or a debit/credit card having conventional information available on the face, may be issued to the requestor in step 412.

Figure 5A:
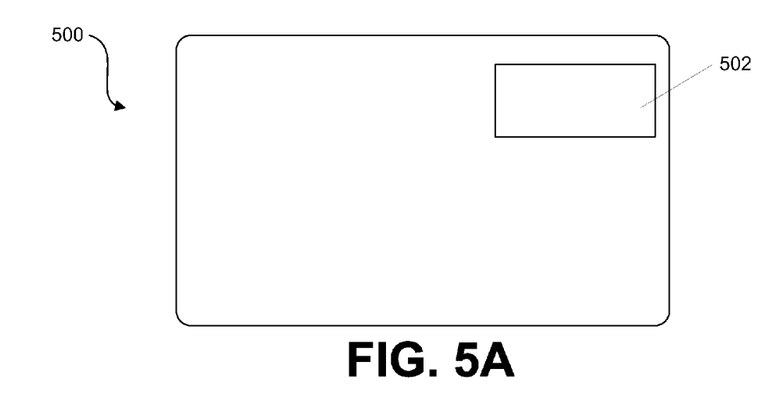
FIGS. 5A-5D illustrate front views of example debit and/or credit cards according to one or more aspects described herein.

FIGS. 5A-5D illustrate various options for providing limited information on the face of the debit and/or credit card in order to add additional security to the card. In FIG. 5A, any information identifying the user, account, and the like associated with the debit/credit card is not physically printed on the card (e.g., the information is not visually available on the card). The information may, in some examples, be encoded on the magnetic strip on the rear of the card and this information may, in some examples, be encrypted, as will be discussed more fully below. In some examples, the card may include a provider identifier region, such as region 502. This region may include a watermark or other logo of the financial institution or other entity providing the debit card. Although the card may include one or more patterns, decorative designs, photographs, and the like, no information distinctly identifying the name of the user, account associated with the debit card, expiration date of the card, and the like is visually available on the card.

Figure 5B:
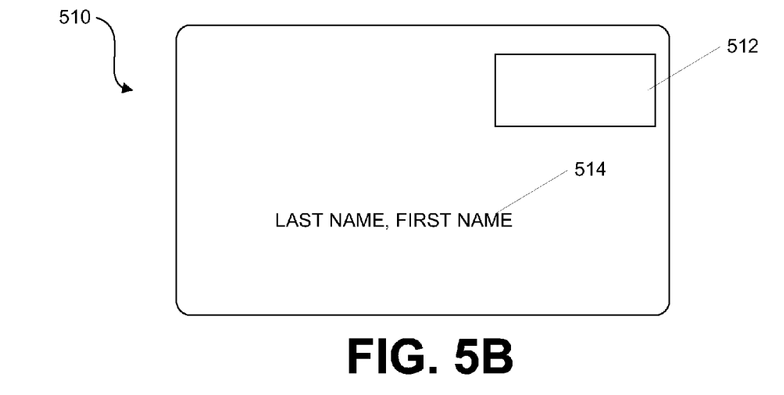

FIG. 5B illustrates another debit card arrangement having limited printed information to provide heightened security. Similar to the card 500 in FIG. 5A, the card 510 may include a provider identification region 512. Additionally or alternatively, the card may include a name region 514. The name region may provide a name of a user associated with the card. However, as shown in FIG. 5B, no additional information identifying the user or account associated with the card is provided. That is, the account number, expiration date, and the like are not provided visually on the card. Thus, a person wishing to use the card for, for instance, an online transaction, would have to access the account number in an alternate manner, such as from debit card provider documents, from memory, and the like. This may aid in preventing unauthorized use of the debit card 500.

In some examples, all necessary information may be encoded on the magnetic strip on the rear of the card. Alternatively, a limited amount of information may be provided in the magnetic strip in order to further heighten security. In still other examples, some or all of the information encoded on the magnetic strip may be encrypted to add additional security. Encryption of some or all of the information encoded on the magnetic strip may limit access to the encrypted information to magnetic strip readers configured with decryption capabilities. This information encoded on the magnetic strip that may, in some examples, be encrypted, may include a name of a user associated with the card and, in some cases, personal information of the user such as address information, and the like, an account number associated with the card, an expiration date of the card, CSC number, PIN, and the like.

Figure 5C:
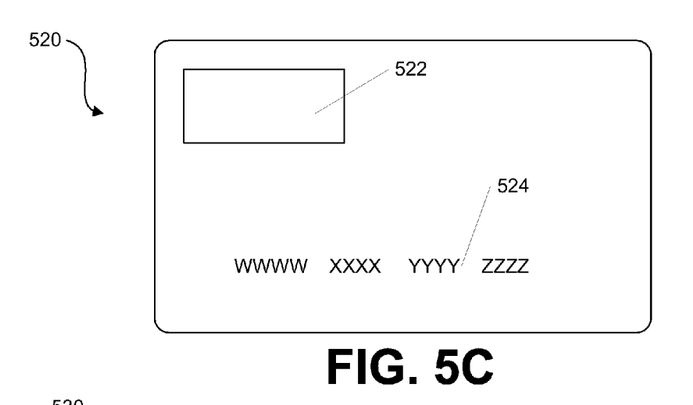

FIG. 5C illustrates yet another example debit/credit card 520 having limited information to aid in security associated with the card. The card 520 may include a provider identification region 522. Additionally or alternatively, the card 520 may include an account number region 524. The account number region 524 may include an account number associated with the debit/credit card. This arrangement may allow a person who knows the name of the card holder (such as the card holder) to conduct transactions requiring input of the name associated with the card (such as online transactions), while preventing unauthorized users who would not know the card holder name to conduct such transactions.

Figure 5D:
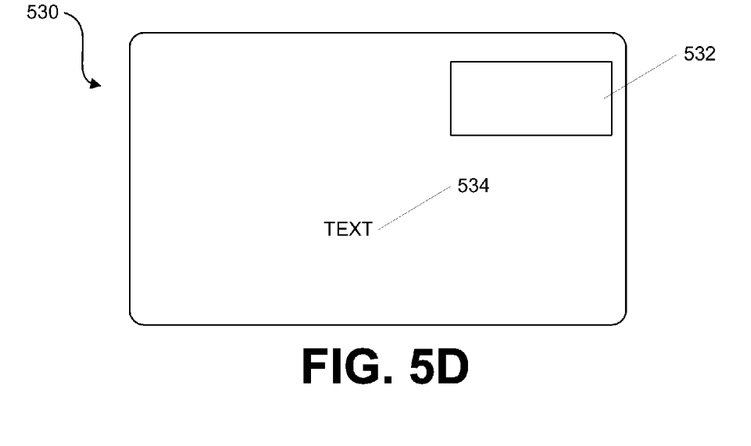

FIG. 5D illustrates yet another example debit/credit card 530 having increased security. The debit card 500 may include a provider identification region 532. Additionally or alternatively, the debit/credit card 530 may include a text region 534. The text region may include one or more pieces of information such as the user, account number, and the like. Alternatively, the text region 534 may include a card identifier to distinguish one card from another without providing information identifying the user, account associated with the card, and the like. For instance, the text region may include a nickname for the user, such as "Customer #1's Card." In another example, the text region 534 may include a nickname for an account associated with the card, such as "Personal Checking." In still another example, the card may be shared among one or more individuals, such as the children of the account holder, and the text region may include the label "Kid's Card." Although the text region may include some information relating to the user, the card does not provide all information necessary to complete all transactions visually on the card.

FIG. 6A illustrates the rear of an example debit card in accordance with aspects of this invention. Debit card 600 includes a magnetic strip 602 extending across the rear of the card. As discussed above, this magnetic strip 602 may be encoded with information regarding the user or card holder, account number associated with the card, expiration date of the card, and the like and, in some examples, the information encoded may be encrypted. Some or all of the information encoded on the magnetic strip 602 may not be visually shown on the debit/credit card 600. Further, the magnetic strip 602 may, in some examples, have limited information encoded on it in order to provide heightened security.

The debit/credit card 600 may further include a provider identification region 604. As discussed above, the provider identification region 604 may include a logo or name of a financial institution or other entity providing the debit card 600. Additionally or alternatively, the card 600 may include a text region 606. The text region may include information identifying contact information should the card be lost or stolen.

Figure 6:
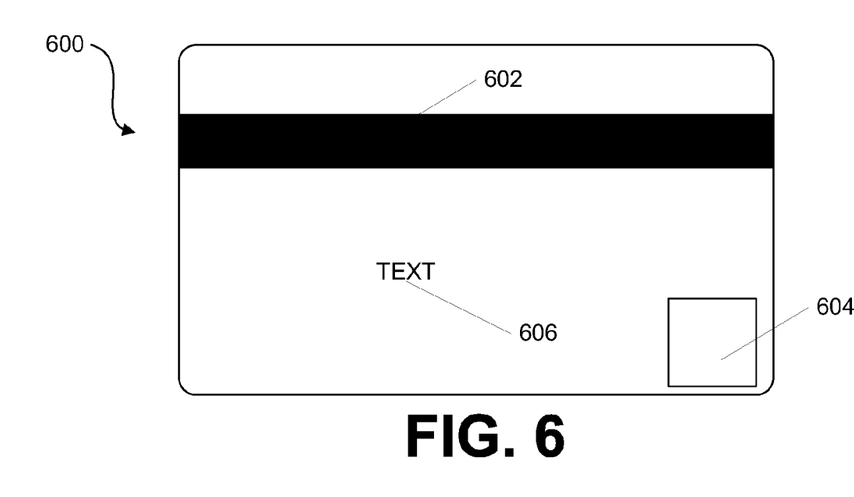
FIG. 6 illustrates a rear view of one example debit and/or credit card according to one or more aspects described herein.

As shown in FIG. 6A, no additional numbers or identifying information is provided on the rear of the card 600. For instance, conventional debit and/or credit cards often include a card security code (CSC) on the back of the card. The CSC may also be referred to as a card verification value (CVV), card verification code (CVC), card code verification (CCV), and the like and is generally a three-digit code located on the rear of the card. In some cases, the CSC is positioned on an end of the signature portion of the rear of the card. The CSC is often required for various types of transactions, such as on-line transactions, as an additional form of identification. However, the card 600 does not include this code. Accordingly, if the card is lost or stolen, an individual may be prevented from completing transactions requiring input of the CSC. However, an authorized user may have access to the CSC from alternate sources (e.g., from memory, additional documentation provided by the financial institution providing the card, and the like) and thus, could still conduct online or other transactions with the card. The arrangement shown in FIG. 6 may be used with any of the various security features and combinations of information discussed above without departing from the invention.

In still other examples of heightened debit/credit card security, a variable personal identification number may be used to authorize use of the card. For instance, a smart phone may include an app that may generate a PIN number unique to each use of the debit card. The variable pin number may be generated on demand by the user or may be generated in advance and provided to the user when requested. The app may communicate with the financial institution providing the debit card in order to receive the variable PIN number and store it to authorize the transaction as needed. Accordingly, a user may be able to use a different PIN for each transaction, which may further reduce the likelihood of fraudulent transactions.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method, comprising:
   determining, by a data processing device at a financial institution, a plurality of payment card security levels;
   determining, by data processing device, a set of physical features associated with a payment card at each determined security level;
   receiving, by the data processing device, a request for a first payment card;
   determining, by the data processing device, based on at least the received request for the first payment card, an appropriate level of security for the first payment card from the determined plurality of payment card security levels; and
   providing, by the data processing device, the first payment card having the determined set of physical features associated with the payment card of the appropriate level of security.

2. The method of claim 1, wherein the determined set of physical features of the first payment card includes a name.

3. The method of claim 1, wherein the determined set of physical features of the first payment card does not include an account number associated with the first payment card.

4. The method of claim 1, wherein the determined set of physical features of the first payment card does not include a name of a card holder associated with the first payment card.

5. The method of claim 1, wherein the payment card is at least one of a debit card and a credit card.

6. The method of claim 1, further including:
   receiving, by the processor, a request for a second payment card;
   determining, by the data processing device, based on at least the received request for the second payment card, an appropriate level of security for the second payment card from the determined plurality of payment card security levels, the appropriate level of security of the second payment card being different from the appropriate level of security of the first payment card; and
   providing, by the data processing device, the second payment card having the determined set of physical features associated with the payment card of the appropriate level of security, the determined set of physical features of the second payment card being different from the determined set of physical features of the first payment card.

7. The method of claim 1, wherein determining the appropriate level of security is based on a request for a higher level of security.

8. A method, comprising:
determining, by a data processing device at a financial institution, a first payment card security level and a second payment card security level; and
determining, by the data processing device, a first set of physical features associated with a first payment card having the first payment card security level and a second set of physical features associated with a second payment card having the second payment card security level,
wherein the first set of physical features includes a plurality of physical features different from a plurality of physical features of the second set of physical features.

9. The method of claim 8, wherein the first payment card and the second payment card are at least one of a debit card and a credit card.

10. The method of claim 8, wherein the first set of physical features includes a name associated with the first payment card, an account number associated with the first payment card and an expiration date associated with the first payment card.

11. The method of claim 10, wherein the second set of physical features includes a name associated with the second payment card and does not include an account number associated with the second payment card and an expiration date associated with the second payment card.

12. The method of claim 10, wherein the second set of physical features includes an account number associated with the second payment card and does not include a name associated with the second payment card and an expiration date associated with the second payment card.

13. The method of claim 10, wherein the second set of physical features includes an account number associated with the second payment card and an expiration date associated with the second payment card and does not include a name associated with the second payment card.

14. A computer readable medium storing computer readable instructions that, when executed, cause an apparatus to:
determine, at a financial institution, a plurality of payment card security levels;
determine, at the financial institution, a set of physical features associated with a payment card at each determined security level;
receive, at the financial institution, a request for a first payment card;
determine, based on at least the received request for the first payment card, an appropriate level of security for the first payment card from the determined plurality of payment card security levels; and
provide the first payment card having the determined set of physical features associated with the payment card of the appropriate level of security.

15. The computer readable medium of claim 14, wherein the first payment card is at least one of a debit card and a credit card.

16. The computer readable medium of claim 14, wherein the determined set of physical features of the first payment card includes a name.

17. The computer readable medium of claim 14, wherein the determined set of physical features of the first payment card does not include an account number associated with the first payment card.

18. The computer readable medium of claim 14, wherein the determined set of physical features of the first payment card does not include a name of a card holder associated with the first payment card.

19. The computer readable medium of claim 14, wherein the instructions further cause the apparatus to:
receive, at the financial institution, a request for a second payment card;
determine, based on at least the received request for the second payment card, an appropriate level of security for the second payment card from the determined plurality of payment card security levels, the appropriate level of security of the second payment card being different from the appropriate level of security of the first payment card; and
provide the second payment card having the determined set of physical features associated with the payment card of the appropriate level of security, the determined set of physical features of the second payment card being different from the determined set of physical features of the first payment card.

20. An apparatus comprising:
a processor; and
memory operatively coupled to the processor and storing computer readable instructions that, when executed, cause the apparatus to:
determine, at a financial institution, a plurality of payment card security levels;
determine, at the financial institution, a set of physical features associated with a payment card at each determined security level;
receive, at the financial institution, a request for a first payment card;
determine, based on at least the received request for the first payment card, an appropriate level of security for the first payment card from the determined plurality of payment card security levels; and
provide the first payment card having the determined set of physical features associated with the payment card of the appropriate level of security.

21. The apparatus of claim 20, wherein the determined set of physical features of the first payment card includes a name.

22. The apparatus of claim 20, wherein the determined set of physical features of the first payment card does not include an account number associated with the first payment card.

23. The apparatus of claim 20, wherein the determined set of physical features of the first payment card does not include a name of a card holder associated with the first payment card.

24. The apparatus of claim 17, wherein the instructions further cause the apparatus to:
receive, at the financial institution, a request for a second payment card;
determine, based on at least the received request for the second payment card, an appropriate level of security for the second payment card from the determined plurality of payment card security levels, the appropriate level of security of the second payment card being different from the appropriate level of security of the first payment card; and
provide the second payment card having the determined set of physical features associated with the payment card of the appropriate level of security, the determined set of physical features of the second payment card being different from the determined set of physical features of the first payment card.

* * * * *